US012469060B2

(12) United States Patent
Han

(10) Patent No.: US 12,469,060 B2
(45) Date of Patent: Nov. 11, 2025

(54) AUTOMOBILE TRADE BROKERAGE PLATFORM SYSTEM, AUTOMOBILE TRADE BROKERAGE METHOD, AND COMPUTER PROGRAM THEREFOR

(71) Applicant: AUTOWINI INC., Seoul (KR)

(72) Inventor: Ji Young Han, Seongnam-si (KR)

(73) Assignee: Autowini Inc., Seoul (KR)

( * ) Notice: Subject to any disclaimer, the term of this patent is extended or adjusted under 35 U.S.C. 154(b) by 149 days.

(21) Appl. No.: 17/797,978

(22) PCT Filed: Feb. 5, 2020

(86) PCT No.: PCT/KR2020/001640
§ 371 (c)(1),
(2) Date: Aug. 5, 2022

(87) PCT Pub. No.: WO2021/157754
PCT Pub. Date: Aug. 12, 2021

(65) Prior Publication Data
US 2023/0054733 A1     Feb. 23, 2023

(51) Int. Cl.
*G06Q 30/0601*     (2023.01)
*G06Q 10/0831*     (2023.01)
(Continued)

(52) U.S. Cl.
CPC ..... *G06Q 30/0619* (2013.01); *G06Q 10/0831* (2013.01); *G06Q 10/0835* (2013.01); *G06Q 30/04* (2013.01)

(58) Field of Classification Search
CPC ........... G06Q 30/0619; G06Q 10/0831; G06Q 10/0835; G06Q 30/04; G06Q 30/0613;
(Continued)

(56) References Cited

U.S. PATENT DOCUMENTS

| 11,430,033 | B2 * | 8/2022 | Aggarwal | .......... | G06Q 30/0206 |
| 2001/0018672 | A1 * | 8/2001 | Petters | .................... | G06Q 30/06 |
| | | | | | 705/26.42 |

(Continued)

FOREIGN PATENT DOCUMENTS

| JP | 2000-310536 | 11/2000 |
| JP | 2003-173405 | 6/2003 |

(Continued)

OTHER PUBLICATIONS

J. Zhang, H. Zhao, Y. Yang and J. Yan, "Towards Transparency and Trustworthy: A Used-Car Deposit Platform Based on Blockchain," 2019 IEEE 19th International Conference on Software Quality, Reliability and Security Companion (QRS-C), Sofia, Bulgaria, 2019, pp. 46-50 (Year: 2019).*

(Continued)

*Primary Examiner* — Sarah M Monfeldt
*Assistant Examiner* — Karma A El-Chanti
(74) *Attorney, Agent, or Firm* — Fish & Richardson P.C.

(57) ABSTRACT

An automobile trade brokerage platform system may include: an item registration unit configured to register automobile products to be sold by one or more sellers as items for sale; a purchase processing unit configured to receive a purchase request for an item for sale among the items for sale from a buyer, generate a proforma invoice corresponding to the purchase request, and transmit the proforma invoice to the buyer; a shipping agency unit configured to, when a purchase amount corresponding to the proforma invoice is paid by the buyer, generate a commercial invoice corresponding to the automobile product purchased by the buyer and request a server of a forwarding company for shipping, and provide information about a bill of landing to the buyer; and a payment unit configured to pay a sale amount to the seller after the automobile product (Continued)

requested by the buyer is received from the seller. The shipping agency unit may be further configured to respectively provide commercial invoices for the buyer, the seller, and the forwarding company corresponding to the automobile product purchased by the buyer, and in this case, the commercial invoices may include different information according to trade terms from among product details, product price information, freight information, and insurance information.

5 Claims, 4 Drawing Sheets

(51) Int. Cl.
*G06Q 10/0835* (2023.01)
*G06Q 30/04* (2012.01)

(58) Field of Classification Search
CPC .............. G06Q 30/0635; G06Q 30/06; G06Q 30/0627; G06Q 30/08; G06Q 50/40
See application file for complete search history.

(56) References Cited

U.S. PATENT DOCUMENTS

| | | | | |
|---|---|---|---|---|
| 2002/0095355 A1* | 7/2002 | Walker | ................. | G06Q 50/188 705/26.4 |
| 2002/0143646 A1* | 10/2002 | Boyden | ................. | G06Q 30/08 705/1.1 |
| 2007/0255627 A1* | 11/2007 | Hallowell | ............... | G06Q 30/02 705/26.81 |
| 2008/0021714 A1* | 1/2008 | Kraez | .................... | G06Q 10/08 705/333 |
| 2009/0006250 A1* | 1/2009 | Bixler | .................... | G06Q 20/10 705/39 |
| 2009/0138379 A1* | 5/2009 | Scheman | ........... | G06Q 30/0601 705/26.1 |
| 2012/0265634 A1* | 10/2012 | Kinney | .................. | G06Q 30/06 705/26.4 |
| 2013/0262336 A1* | 10/2013 | Wan | ...................... | G06Q 10/087 705/339 |
| 2015/0254762 A1* | 9/2015 | Fisher | .................... | G06Q 30/08 705/26.3 |
| 2016/0034590 A1* | 2/2016 | Endras | .................. | G06Q 30/08 707/770 |
| 2016/0148446 A1* | 5/2016 | Corriere | ............... | G07C 5/0816 701/29.1 |
| 2018/0150907 A1* | 5/2018 | Antley | .................... | G06Q 30/08 |
| 2019/0172128 A1* | 6/2019 | Fisher | .................. | G06F 16/957 |
| 2019/0378180 A1* | 12/2019 | Endras | ............... | G06Q 30/0283 |
| 2020/0065885 A1* | 2/2020 | Smith | ................. | G06Q 30/0278 |
| 2020/0134551 A1* | 4/2020 | Singh | ...................... | G06Q 20/10 |
| 2020/0349595 A1* | 11/2020 | Anderson | ............... | G06F 30/20 |
| 2022/0084082 A1* | 3/2022 | Yi | .......................... | G06Q 30/018 |
| 2023/0162243 A1* | 5/2023 | Southin | .................. | G06Q 30/06 705/306 |

FOREIGN PATENT DOCUMENTS

| | | |
|---|---|---|
| JP | 2005-216093 | 8/2005 |
| JP | 2023102846 A * | 7/2023 |
| KR | 10-20010100178 | 11/2001 |
| KR | 10-20030023410 | 3/2003 |
| KR | 10-20030026410 | 4/2003 |
| KR | 10-20080041042 | 5/2008 |
| KR | 10-20110047384 | 5/2011 |
| KR | 10-20110097731 | 8/2011 |
| KR | 10-20130083086 | 7/2013 |
| KR | 10-20180129119 | 12/2018 |
| KR | 10-2010786 | 8/2019 |
| KR | 10-2124529 | 6/2020 |

OTHER PUBLICATIONS

International Preliminary Report on Patentability in International Appln. No. PCT/KR2020/001640, mailed on Aug. 18, 2022, 15 pages (with English Translation).
International Search Report and Written Opinion in International Appln. No. PCT/KR2020/001640, mailed on Nov. 13, 2020, 18 pages (with English Translation).

* cited by examiner

[FIG. 1]
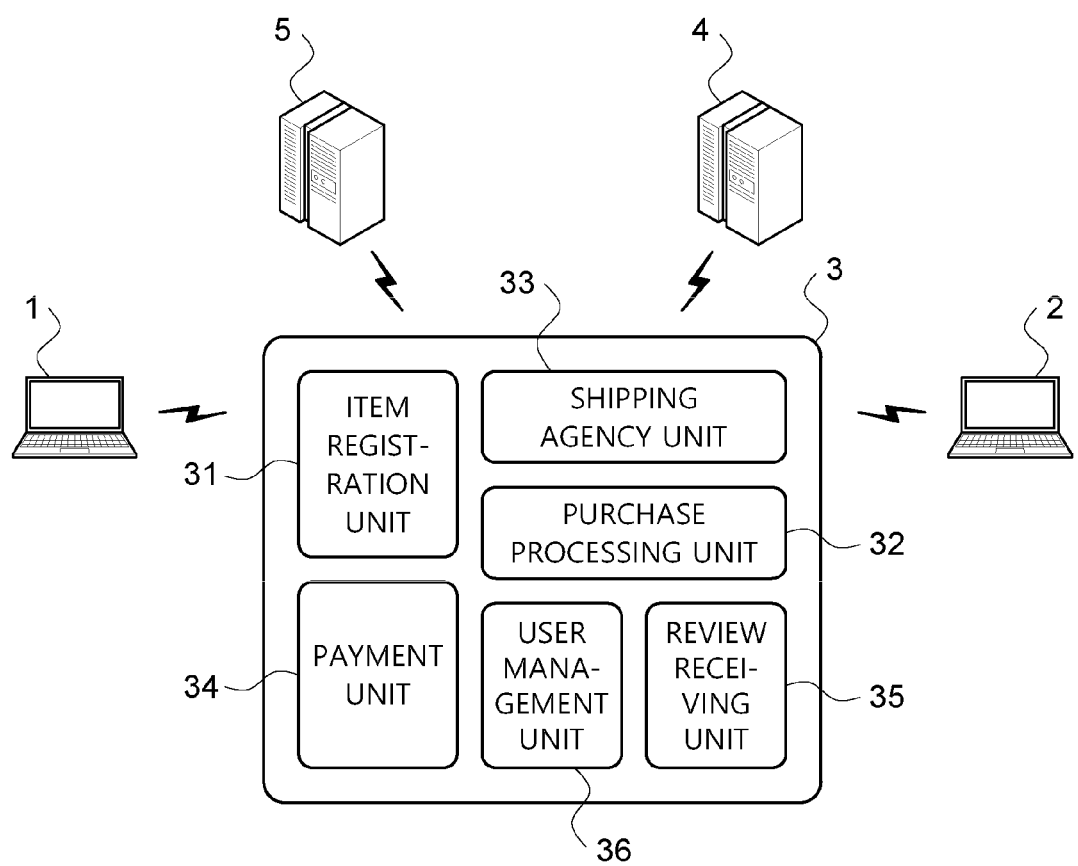

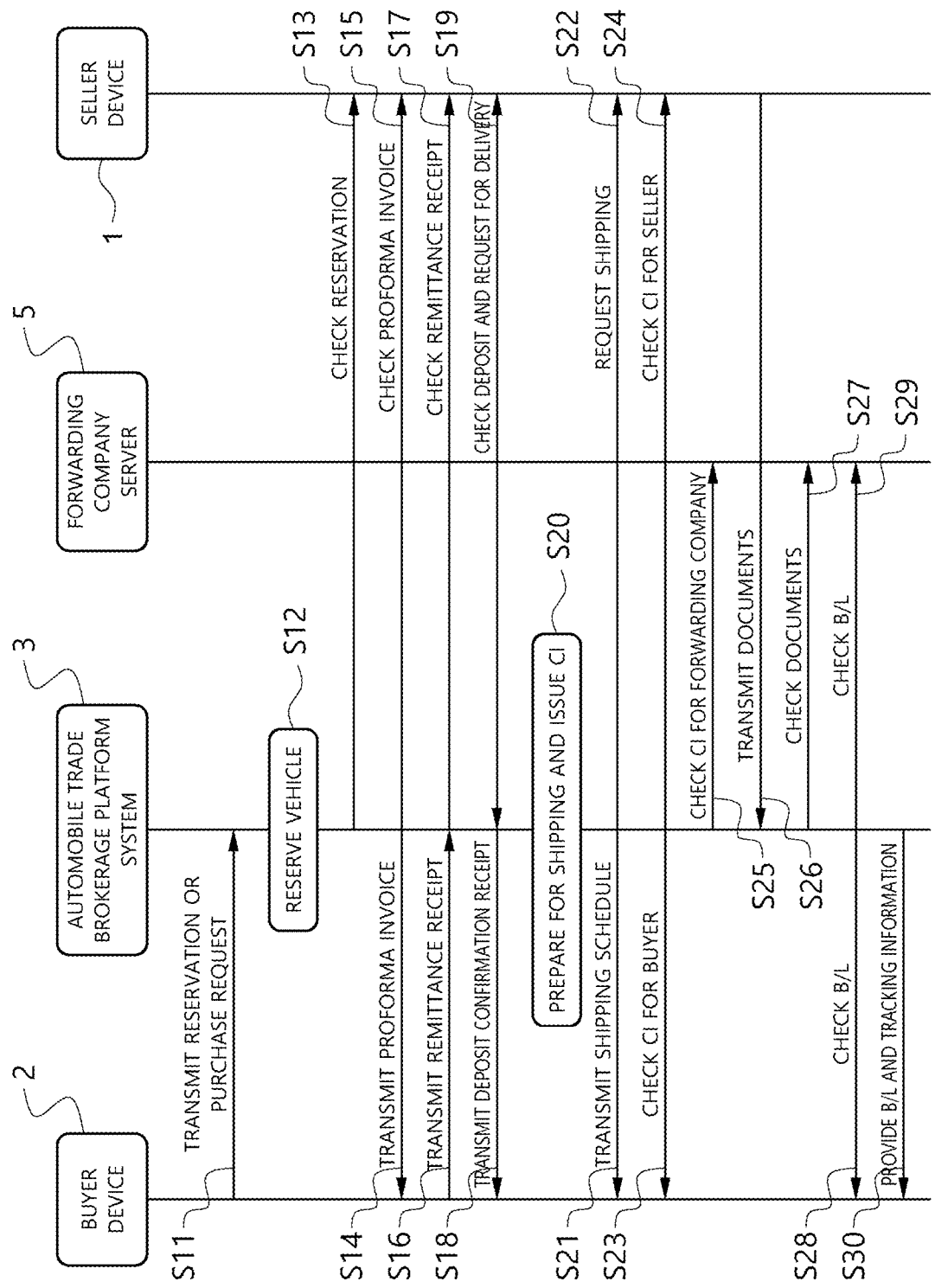

[FIG. 3]

| Details ||
|---|---|
| Item | ![car image] BUY IT SAFELY / VIDEO STOCK |
| Quotation | Country & Port — S.Korea / Incheon |
| | Item Price — USD 2800 |
| | Ocean Freight — USD 800 |
| | Wharfage fee — USD 5 |
| | Loading fee — USD 44 |
| | Documents fee — USD 25 |
| | Total Price — USD 3,674 CFR, Incheon, S.Korea |

Go To The List | Confirm to Buy ⟶ STEP 3 — Confirm Purchase

| Consignee's Information | |
|---|---|
| Full Name | Edgar |
| Email Address | sample.edgar@autowini.com |
| Tel / Mobile 1 | +23-0000-0000 |
| Tel / Mobile 2 | +23-0000-1111 |
| Full Address | #1000 Sam Link, Accra, Ghana P.O.Box 00000 |
| Additional Info. | |

Edit Consignee's Infomation | Recent Address

400

[FIG. 5]
| Shipping Information | | | |
|---|---|---|---|
| Vessel Name | | Vessel Type | Ro-Ro |
| Voy No | | Line | |
| Estimated Time of Departure(ETD) | 2016.11.11 | Estimated Time of Arrival(ETA) | |
| Country of Loading | S.Korea | Country of Discharging | Incheon |
| Port of Loading | Ghana | Port of Discharging | Tema |
[FIG. 6]
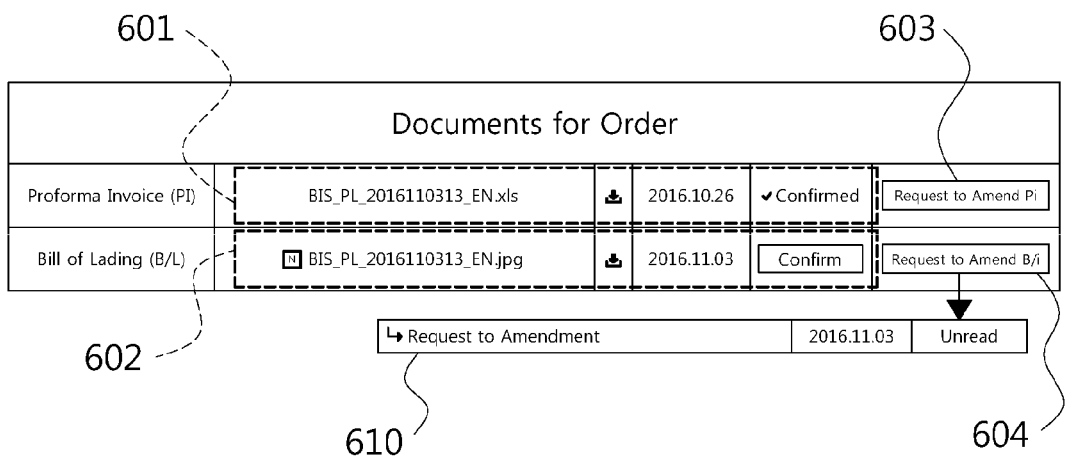

AUTOMOBILE TRADE BROKERAGE PLATFORM SYSTEM, AUTOMOBILE TRADE BROKERAGE METHOD, AND COMPUTER PROGRAM THEREFOR

CROSS REFERENCE TO RELATED APPLICATIONS

This application is a National Stage application under 35 U.S.C. § 371 of International Application No. PCT/KR2020/001640, having an International Filing Date of Feb. 5, 2020. The disclosure of the prior application is considered part of the disclosure of this application, and is incorporated in its entirety into this application.

TECHNICAL FIELD

Embodiments relate to an automobile trade brokerage platform system, an automobile trade brokerage method, and a computer program therefor, and more particularly, to a global automobile trading platform for directly connecting a seller of an automobile to a buyer and performing direct export/direct import-related tasks such as payment, document delivery, and shipping.

BACKGROUND ART

With the recent rapid development of information and communication technology, most goods have become available for sale through the Internet. Among them, there is a business method of brokering or trading used cars by using the Internet. For example, Korean Patent Publication No. 10-2011-0047384 discloses a system and method for managing the trading of a used car by which information about the quality and performance of used cars are provided to consumers and a used car sales process may be performed in a communication method through a network.

However, conventional technologies including the system for managing the trading of a used car disclosed in Korean Patent Publication No. 10-2011-0047384 only assist in buying and selling used cars between sellers and buyers in the same country. There has been no information processing system capable of easily handling vehicle export and export procedures (e.g., used cars) from one country to another.

Unlike trade in the same country, in the case of export or import, sellers and buyers are located in different countries, and thus, there is a relatively high risk that the sellers and buyers will not receive payments or goods normally. Also, trade processing procedures through several stages such as the provision of documents for shipping and import/export are required, but there has not been a system that may easily trade used cars and the like across borders between countries.

DISCLOSURE

Technical Problem

According to an aspect of the present disclosure, an automobile trade brokerage platform system, an automobile trade brokerage method, and a computer program therefor are provided, which may remove inefficiency in multi-stage trade and enable global automobile trade, by directly connecting a seller and a buyer of an automobile located in different countries and performing direct export/direct import-related tasks such as payment, document delivery, and shipping.

Technical Solution

An automobile trade brokerage platform system according to an embodiment includes: an item registration unit configured to register automobile products to be sold by one or more sellers as items for sale; a purchase processing unit configured to receive a purchase request for an item for sale among the items for sale from a buyer, generate a proforma invoice corresponding to the purchase request, and transmit the proforma invoice to the buyer; a shipping agency unit configured to, when a purchase amount corresponding to the proforma invoice is paid by the buyer, generate a commercial invoice corresponding to the automobile product purchased by the buyer and request a server of a forwarding company for shipping, and provide information about a bill of landing to the buyer; and a payment unit configured to pay a sale amount to the seller after the automobile product requested by the buyer is received from the seller.

The shipping agency unit may be further configured to generate a first commercial invoice for the buyer, a second commercial invoice for the seller, and a third commercial invoice for the forwarding company corresponding to the automobile product purchased by the buyer, and respectively provide the first commercial invoice, the second commercial invoice, and third commercial invoice to the buyer, the seller, and the forwarding company. In this case, the first commercial invoice, the second commercial invoice, and the third commercial invoice include at least one different information extracted according to predetermined trade terms from among product details, product price information, freight information, and insurance information corresponding to the automobile product purchased by the buyer.

In an embodiment, the item registration unit may be further configured to provide a vehicle condition report corresponding to a vehicle.

In an embodiment, the item registration unit may be further configured to generate the vehicle condition report by detecting at least one of corrosion, holes, or cracks formed in at least a portion of the vehicle from a vehicle image received from the seller.

In an embodiment, the first commercial invoice may include product details, product price, and ocean freight corresponding to the automobile product requested to be purchased, the second commercial invoice may include the product details and the product price and may not include the ocean freight, and the third commercial invoice may include the product details and may not include the product price.

An automobile trade brokerage method according to an embodiment includes: registering automobile products to be sold by one or more sellers as items for sale in an automobile trade brokerage platform system; receiving, by the automobile trade brokerage platform system, a purchase request for an item for sale among the items for sale from a buyer; generating, by the automobile trade brokerage platform system, a proforma invoice corresponding to the purchase request and transmitting the proforma invoice to the buyer; when a purchase amount corresponding to the proforma invoice is paid by the buyer, generating, by the automobile trade brokerage platform system, a commercial invoice corresponding to the automobile product purchased by the buyer and requesting a server of a forwarding company for shipping; providing, by the automobile trade brokerage platform system, information about a bill of landing to the buyer; and paying, by the automobile trade brokerage platform system, a sale amount to the seller after the automobile product requested by the buyer is received from the seller.

In this case, the requesting for the shipping may include generating, by the automobile trade brokerage platform system, a first commercial invoice for the buyer, a second commercial invoice for the seller, and a third commercial invoice for the forwarding company corresponding to the automobile product purchased by the buyer and respectively providing the first commercial invoice, the second commercial invoice, and third commercial invoice to the buyer, the seller, and the forwarding company, wherein the first commercial invoice, the second commercial invoice, and the third commercial invoice include at least one different information extracted according to predetermined trade terms from among product details, product price information, freight information, and insurance.

The automobile trade brokerage method according to an embodiment may further include providing, by the automobile trade brokerage platform system, a vehicle condition report corresponding to a vehicle.

In an embodiment, the providing of the vehicle condition report may include generating, by the automobile trade brokerage platform system, the vehicle condition report by detecting at least one of corrosion, holes, or cracks formed in at least a portion of the vehicle from a vehicle image received from the seller.

A computer program according to an embodiment is stored in a computer-readable recording medium to execute the automobile trade brokerage method according to the above embodiments in combination with hardware.

Advantageous Effects

When an automobile trade brokerage platform system and an automobile trade brokerage method according to an aspect of the present disclosure are used, as a seller and a buyer of an automobile located in different countries are directly connected through the automobile trade brokerage platform system, direct transaction may be performed. As accurate information of a product, safe shipping, and timely payment are guaranteed through the automobile trade brokerage platform, safe transaction may be performed.

Also, in an automobile trade brokerage platform system according to an aspect of the present disclosure, a buyer and a seller may check a present condition such as payment of a purchase amount and shipping schedule through a tracking system provided by an automobile trade brokerage platform in real time, may check a proforma invoice and a bill of landing, and may easily request correction when necessary.

DESCRIPTION OF DRAWINGS

FIG. 1 is a block diagram illustrating an automobile trade brokerage platform according to an embodiment.

FIG. 2 is a flowchart illustrating an automobile trade brokerage method according to an embodiment.

FIG. 3 is a conceptual view illustrating a user interface (UI) for displaying item information by an automobile trade brokerage platform system according to an embodiment.

FIG. 4 is a conceptual view illustrating a UI through which a consignee is input to an automobile trade brokerage platform system according to an embodiment.

FIG. 5 is a conceptual view illustrating a UI for displaying transportation information by an automobile trade brokerage platform system according to an embodiment.

FIG. 6 is a conceptual view illustrating a UI through which a proforma invoice and a bill of landing are checked through an automobile trade brokerage platform system according to an embodiment.

MODE FOR INVENTION

Embodiments of the present disclosure will be described in detail with reference to the drawings.

FIG. 1 is a block diagram illustrating an automobile trade brokerage platform system according to an embodiment.

In an embodiment, an automobile trade brokerage platform system 3 includes an item registration unit 31, a purchase processing unit 32, a shipping agency unit 33, and a payment unit 34. In an embodiment, the automobile trade brokerage platform system 3 further includes a review receiving unit 35. Also, in an embodiment, the automobile trade brokerage platform system 3 further includes a user management unit 36.

The automobile trade brokerage platform system 3 according to embodiments may be entirely hardware, or may be partially hardware and partially software. For example, each unit included in the automobile trade brokerage platform system 3 may collectively refer to hardware and related software for processing data in a specific format or content and/or transmitting and receiving data in an electronic communication method. In the specification, the term such as "unit", "module", "device", "terminal", "server", or "system" is indented to refer to a combination of hardware and software driven by the hardware. For example, hardware may be a data processing device including a central processing unit (CPU) or another processor. Also, software driven by hardware may be a running process, an object, an executable file, a thread of execution, or a program.

Also, elements constituting the automobile trade brokerage platform system 3 according to the present embodiments are not necessarily intended to refer to separate devices that are physically distinguished from each other. That is, the item registration unit 31, the purchase processing unit 32, the shipping agency unit 33, the payment unit 34, the review receiving unit 35, and the user management unit 36 of FIG. 1 are obtained by functionally classifying hardware constituting the automobile trade brokerage platform system 3 according to an operation performed by the hardware, and do not necessarily have to be independently provided. According to an embodiment, at least one of the item registration unit 31, the purchase processing unit 32, the shipping agency unit 33, the payment unit 34, the review receiving unit 35, and the user management unit 36 may be implemented as a separate device physically distinguished from each other.

The automobile trade brokerage platform system 3 may operate while communicating with one or more user devices 1, 2 and one or more external servers 4, 5 through a wired and/or wireless network. A communication method through a wired and/or wireless network may include any communication method through which objects may network with each other, and is not limited to wired communication, wireless communication, 3G, 4G, or other methods.

For example, the wired and/or wireless network may refer to, but is not limited to, a communication network by at least one communication method selected from the group consisting of local area network (LAN), metropolitan area network (MAN), global system for mobile network (GSM), enhanced data GSM environment (EDGE), high speed downlink packet access (HSDPA), wideband code division multiple access (W-CDMA), code division multiple access (CDMA), time division multiple access (TDMA), Bluetooth, Zigbee, Wi-Fi, voice over Internet protocol (VoIP), long term evolution (LTE) advanced, IEEE802.16m, WirelessMAN-Advanced, HSPA+, 3GPP LTE, mobile WiMAX (IEEE 802.16e), UMB (formerly EV-DO Rev. C), flash- OFDM, iBurst and MBWA (IEEE 802.20) systems, HIPERMAN, beam-division multiple access (BDMA), world interoperability for microwave access (Wi-MAX), and ultrasonic communication.

The user device 1 is a device used by a seller who wants to sell an automobile product, and the user device 2 is a device used by a buyer who wants to purchase an automobile product. In this case, because the seller and the buyer are located indifferent countries, procedures related to export and shipping should be performed in order to trade a product between the seller and the buyer.

Although each of the user devices 1, 2 is illustrated as a laptop computer in FIG. 1, the present disclosure is not limited thereto, and each of the user devices 1, 2 may be implemented as any computing device such as a mobile communication terminal (e.g., a smartphone), a personal computer, a personal digital assistant (PDA), a tablet computer, or a set-top box for Internet protocol television (IPTV).

Also, it will be easily understood that the number of user devices 1, 2 illustrated in FIG. 1 is merely an example for convenience of explanation, and does not necessarily show the actual number of sellers or buyers using the automobile trade brokerage platform system 3. That is, the automobile trade brokerage platform system 3 may register items for sale of a plurality of sellers and may sell the items to a plurality of buyers.

In the specification, the term "automobile product" refers to an automobile itself, or parts or consumables coupled or provided to the inside or outside of an automobile to perform an operation related to the automobile. Although a used vehicle is described as an automobile product in the specification, an automobile product traded through the automobile trade brokerage platform system 3 according to embodiments may be a new vehicle, instead of a used vehicle, or may be parts of a vehicle or consumables related to the vehicle, and is not limited to a specific type of product.

The item registration unit 31 is configured to register automobile products to be sold by one or more sellers as items for sale. To this end, the item registration unit 31 may receive product information related to an automobile product of a seller from the user device 1 of the seller, for example, vehicle information such as type, year, and color of a vehicle, current state information of the vehicle, a vehicle photograph, description of the vehicle, and a price of the vehicle. For example, the item registration unit 31 may provide an online shopping mall in which buyers may check automobile products corresponding to the items for sale, so that the buyers purchase desired automobile products.

The purchase processing unit 32 receives a purchase request for an item for sale from a buyer. To this end, the purchase processing unit 32 may be configured to communicate with the user device 2 of the buyer. Also, the purchase processing unit 32 may generate a proforma invoice (PI) corresponding to the purchase request to the user device 2 of the buyer, which will be described below in detail.

When a purchase amount corresponding to the PI is paid by the buyer to an operator of the automobile trade brokerage platform system 3, the shipping agency unit 33 may generate a commercial invoice (CI) corresponding to the automobile product purchased by the buyer and may proceed with shipping. To this end, the shipping agency unit 33 may communicate with at least one financial institution server 4 in order to determine whether the purchase amount is paid into bank account. Also, the shipping agency unit 33 may request shipping by transmitting the CI and other necessary documents to at least one forwarding company server 5, and may transmit a bill of landing (B/L) issued by the forwarding company to the user device 2 of the buyer.

In the specification, a "forwarding company" that is a representative of a consignor (i.e., the seller of the automobile product or the operator of the automobile trade brokerage system) refers to a forwarding agent that selects an appropriate a transportation means and organically combines cargo and handles all incidental tasks according to transportation until cargo of a transmitter is received and delivered to a consignee (i.e., the buyer of the automobile product) at a destination required by the consignor. Although only one forwarding company server 5 is illustrated, a plurality of forwarding companies may communicate with the automobile trade brokerage platform system 3, and thus, a plurality of forwarding company servers 5 may be provided.

In an embodiment, the shipping agency unit 33 provides tracking information that allows the buyer to check a purchase amount payment confirmation state or a shipping processing state in real time. For example, the buyer may check the PI of the purchased vehicle through a tracking web page provided by the automobile trade brokerage platform system 3, may upload a remittance receipt of the purchase amount, may receive a confirmation receipt for the remittance, may check the CI and shipping information generated by the automobile trade brokerage platform system 3, and may check and receive the B/L, which will be described in detail.

The payment unit 34 is configured to cause a sale amount to be paid to the seller after the automobile product requested by the buyer is received from the seller. Because the automobile trade brokerage platform system 3 holds the purchase amount of the buyer without paying the purchase amount of the buyer to the seller until the automobile product is secured, the risk that the buyer is unable to receive the product even though the buyer has paid the amount may be eliminated.

The user management unit 36 may manage personal information (e.g., personal information, ID, password, etc.) of at least one seller or at least one buyer using the automobile trade brokerage platform system 3, and may match and store all information (PI, CI, and B/L) related to a purchased product to each user, so that the user logs in to the automobile trade brokerage platform system 3 to inquire about a processing state of a product sold or purchased by the user.

The review receiving unit 35 may receive review information related to the product from the buyer receiving the automobile product according to the buyer's selection. For example, the review information may include, but is not limited to, information about the purchased product (e.g., a photograph) and a review input by the buyer about a purchase experience. Also, compensation may be provided in the form of virtual currency (e.g., points) or discount benefits to the buyer that transmits the review after purchasing the product, and compensation information may be stored as information of the buyer in the user management unit 36.

FIG. 2 is a flowchart illustrating an automobile trade brokerage method according to an embodiment. For convenience of explanation, an automobile trade brokerage method according to the present embodiment will be described with reference to FIGS. 1 and 2.

Item information may be registered by one or more sellers in the automobile trade brokerage platform system 3, and a buyer may browse an online shopping mall provided by the automobile trade brokerage platform system 3 by using his/her user device 2 (hereinafter, also referred to as "buyer device"), and may transmit a reservation or purchase request for a desired automobile product to the automobile trade brokerage platform system 3 (Si 1).

FIG. 3 is a conceptual view illustrating a user interface (UI) for displaying item information by an automobile trade brokerage platform system according to an embodiment.

In the online shopping mall provided by the automobile trade brokerage platform system 3, item information such as the state (used or new) of an automobile product that is an item for sale, type (sedan or SUV), manufacturer, grade, model, year, steering method, displacement, transmission, the number of seats, fuel type (diesel or gasoline), the number of doors, color, location, vehicle size, engine power, the number of cylinders, drive type (two-wheel or four-wheel), and option specifications may be updated. The buyer may receive detailed information about a price of a vehicle of interest through the posting on the online shopping mall provided by the automobile trade brokerage platform system 3 or through a separate request.

As shown in FIG. 3, the detailed information of the price may include information such as a country and departure port, price, ocean freight, wharfage fee, loading fee, document fee, and total price of the item. In this case, because the ocean freight and the wharfage fee may vary according to a region where the buyer is located, when the buyer sees the basic posting on the online shopping mall and requests the automobile trade brokerage platform system 3 for a detailed quotation, the automobile trade brokerage platform system 3 may calculate the exact cost based on the buyer's location and may transmit detailed information of the vehicle price to the buyer through the online shopping mall or a separate means such as e-mail.

In an embodiment, the detailed information of the price provided to the buyer may be obtained by automatically calculating a transportation fee from the location of the vehicle to a near port of the buyer (in this case, the transportation fee includes all expenses affected by the location such as ocean freight and wharfage fee). The near port of the buyer may refer to a nearest port where the vehicle may be received from the buyer's current location, and a global positioning system (GPS) device provided in the buyer device 2 or a network address (e.g., IP address) of the buyer device 2 may be used to determine the buyer's current location.

Also, the buyer may, as desired, check detailed information of the vehicle through an image and/or a video, or may check a vehicle condition report provided by the automobile trade brokerage platform system 3.

The vehicle condition report may include information about a condition of each portion such as the degree of corrosion, hole presence, or crack presence when the exterior of the vehicle is divided into multiple portions, and may also display an operation state of each part in the vehicle. For example, the exterior of the vehicle may be divided into a front bumper, a hood, a roof, a trunk cover, a rear bumper, left and right fenders, left and right front doors, left and right rear doors, left and right rocker panels, and left and right quarter panels, and the degree of corrosion, the presence of holes or cracks, etc. in each portion may be displayed in the vehicle condition report. Also, parts inside the vehicle may be divided into an engine, a transmission, a brake system, an air conditioner, a heater, an audio system, a window switch, and a four-wheel drive device and an operation state of each part may be displayed in the vehicle condition report.

In an embodiment, the vehicle condition report may be received by a seller and may be registered in the automobile trade brokerage platform system 3 to be provided to the buyer. For example, the seller may generate the vehicle condition report to be registered in the automobile trade brokerage platform system 3 by specifying a condition of the automobile product to be sold by the seller through a check box or the like provided by the automobile trade brokerage platform system 3.

In another embodiment, the vehicle condition report may be automatically generated by the automobile trade brokerage platform system 3 based on information (e.g., vehicle image) received from the seller. For example, when there is corrosion, holes, or cracks in the exterior of the vehicle, a discontinuous area due to the corrosion, the holes, and/or the cracks are shown on an image of a vehicle surface of a corresponding portion. In this case, the discontinuous area refers to a portion including pixels in which characteristics (e.g., contrast, color, etc.) related to pixels corresponding to the vehicle in the image are significantly changed compared to other portions of the image.

The automobile trade brokerage platform system 3 may distinguish pixels corresponding to a background from pixels corresponding to the vehicle from one or more vehicle images uploaded by the seller. In an area of a closed curve surrounded by the pixels corresponding to the vehicle, the automobile trade brokerage platform system 3 may detect pixels with large deviations in contrast, color or the like, to detect corrosion, holes, and/or cracks formed in an outer iron plate of the vehicle. Also, the automobile trade brokerage platform system 3 may transmit the vehicle condition report, which is automatically generated by image analysis as described above, to the seller before registering the vehicle condition report in the automobile trade brokerage platform system 3, so that the seller checks and approves the content of the vehicle condition report to be registered.

However, a type of the vehicle condition report is merely an example, and a type and a configuration method of information included in the vehicle condition report may vary according to an embodiment.

The buyer may check information necessary for decision to purchase the vehicle and then may use a UI element 300 such as a purchase request button, to transmit a purchase request from the buyer device 2 to the automobile trade brokerage platform system 3. It will be easily understood that a type of the UI element illustrated in the drawing is merely an example.

Referring back to FIGS. 1 and 2, the automobile trade brokerage platform system 3 may cause the automobile product (e.g., used car) to be reserved in response to the purchase request of the specific buyer so that a purchase request by another buyer is impossible (S12), and may transmit the reservation to the user device 1 of the seller (hereinafter, also referred to as "seller device") so that the seller of the vehicle checks the reservation (S13).

Next, the automobile trade brokerage platform system 3 may generate a proforma invoice (PI) corresponding to the requested vehicle and may transmit the PI to the buyer device 2, to request the buyer to remit a purchase amount (S14). In an embodiment, the PI may have the same information content and/or type as the detailed information of the vehicle price shown in FIG. 3. Also, the automobile trade brokerage platform system 3 may transmit the PI to the seller device 1 for confirmation (S15).

When there is no abnormality after checking the PI, the buyer may remit the purchase amount to the operator of the automobile trade brokerage platform system 3, and may transmit a remittance receipt to the automobile trade brokerage platform system 3 (S16). For example, the buyer may upload the remittance receipt to the automobile trade brokerage platform system 3 through a tracking web page provided by the automobile trade brokerage platform system 3. Also, the remittance receipt uploaded by the buyer may be provided to the seller device 1 for confirmation (S17).

In an embodiment, when it is determined that the buyer pays the purchase amount into the operator account of the automobile trade brokerage platform system 3 through the financial institution server 4, the automobile trade brokerage platform system 3 may transmit a deposit confirmation receipt to the buyer device 2 (S18). For example, the deposit confirmation receipt may be issued by a financial institution such as a bank in which the operator account of the automobile trade brokerage platform system 3 is opened. Also, the automobile trade brokerage platform system 3 may transmit deposit confirmation information to the seller device 1, and the seller may request the seller to deliver the vehicle to the operator of the automobile trade brokerage platform system 3 (S19).

When the vehicle is delivered from the seller, the automobile trade brokerage platform system 3 may prepare for shipping through communication with a forwarding company to transport the vehicle to the buyer's location, and may also issue a commercial invoice (CI) for shipping and import/export procedures (S20).

To prepare for shipping, consignee information should be input from the buyer. FIG. 4 is a conceptual view illustrating a UI through which a consignee is input to an automobile trade brokerage platform system according to an embodiment. As shown in FIG. 4, the buyer may input information such as name, email address, phone number, and address of a consignee who is to receive the purchased vehicle, and may correct existing input information by using a UI element 400 when necessary.

Referring back to FIGS. 1 and 2, the automobile trade brokerage platform system 3 may transmit shipping schedule information received from the forwarding company as transportation information to the buyer device 2 based on the information input from the buyer (S21), and may request the seller to ship the vehicle according to the schedule (S22).

FIG. 5 is a conceptual view illustrating a UI for displaying transportation information by an automobile trade brokerage platform system according to an embodiment. As shown in FIG. 5, information such as name and type (container, ro-ro, or bulk) of a vessel corresponding to a transportation service, voyage number, line, estimated time of departure, estimated time of arrival, country of loading, country of discharging, port of loading, and port of discharging may be provided as transportation information to the buyer.

Referring to FIGS. 1 and 2, the automobile trade brokerage platform system 3 may respectively transmit a CI for the buyer (or also referred to as first CI) and a CI for the seller (or also referred to as second CI) to the buyer device 2 and the seller device 1 (S23 and S24). Also, the automobile trade brokerage platform system 3 may transmit a CI for the forwarding company (or also referred to as third CI) to the forwarding company server 5 for confirmation (S25). The CI for each of the buyer, the seller, and the forwarding company may correspond to the automobile product purchased by the buyer, but may include a list of different pieces of information extracted according to predetermined trade terms.

In this case, the trade terms define costs and obligations of each entity related to the transaction and transportation of the automobile product, and include 1) ex-works (EXW) condition in which goods are delivered at the seller's place and export and import customs clearances, etc. are the buyer's obligations; 2) free on board (FOB) condition in which the seller bears all costs until the vehicle passes the ship's rail at a designated port of loading and the buyer bears costs thereafter; 3) cost and freight (CFR) condition in which the seller bears all expenses until the vehicle is shipped and freight costs for carriage to a port of destination; 4) freight, insurance, and freight (CIF) condition in which the seller bears insurance in addition to the term CFR; 5) delivered duty unpaid (DDU) condition in which the seller delivers the vehicle to the buyer's designated place but does not pay an import clearance fee; and 6) delivered duty paid (DDP) condition in which the seller pays an import clearance fee in addition to the term DDU.

The automobile trade brokerage platform system 3 may generate the CI for each of the buyer, the seller, and the forwarding company, by extracting at least one information according to the trade terms from among product details, product price information, freight information, and insurance information corresponding to the automobile product. In this case, the trade terms may be collectively set for all automobile products by the automobile trade brokerage platform system 3, or may be set by the seller of the automobile product and then may be determined by the buyer's consent.

For example, in an embodiment, the CI for the buyer may be written under the term CFR condition including product details (e.g., cargo content, quantity, weight, and size), product price (including a fee of the operator of the automobile trade brokerage platform system 3), and ocean freight. The CI for the forwarding may not include price, but may include only product details (e.g., cargo content, quantity, weight, and size). Also, the CI for the seller may be written under the FOB condition including product details and product price and but not including ocean freight.

When there is no information about terms collectively set by the automobile trade brokerage platform system 3 or trade terms predetermined by the seller, the automobile trade brokerage platform system 3 may refer to a transaction history of another vehicle similar to the automobile product to be traded, may determine trade terms matched to the automobile product, and may propose the trade terms to the seller and/or the buyer.

In this case, the other vehicle similar to the automobile product to be traded may be a vehicle similar to the automobile product in price, state (used or new), type (sedan or SUV), manufacturer, grade, model, year, steering method, displacement, transmission, the number of seats, fuel type (diesel or gasoline), the number of doors, color, location, vehicle size, engine power, the number of cylinders, drive type (two-wheel or four-wheel), and option specifications. For example, for factors described above, a score may be given when a factor is the same in both automobile products, and a similarity between the automobile products may be calculated by summing scores given to all the factors. In this case, scores given to factors may be equally summed, or scores given to factors may be summed so that scores for some factors (e.g., type, manufacturer, model, year, displacement, and fuel type) have a higher weight than those of other factors (e.g., the number of seats, the number of doors, color, and option).

Also, the automobile trade brokerage platform system 3 may receive other documents necessary for transportation from the seller device 1, and may transmit the other documents to the forwarding company server 5 for confirmation (S26 and S27). The other documents necessary for transportation may include, but are not limited to, a shipping request, an export declaration, an export license (in the case of an item subjected to export permit), a packing list, and a certificate of weight and volume.

Also, the automobile trade brokerage platform system 3 may generate a bill of landing (B/L) for the buyer to receive the vehicle at a port of discharging and may transmit the B/L to the buyer and the forwarding company for confirmation (S28 and S29). When the confirmation of the buyer and the forwarding company is completed, the operator of the automobile trade brokerage platform system 3 may send the original B/L to the place designated by the buyer, and may provide a transportation state as part of tracking information to the buyer (S30). That is, the automobile trade brokerage platform system 3 may provide delivery information of the vehicle that is a product and delivery information of the B/L as separate tracking information to the buyer device 1.

In the above embodiment, the providing of the PI to the buyer, the transmitting of the remittance receipt and the receiving of the deposit conformation receipt by the buyer, and the providing of the CI, the B/L, or the other documents to the buyer, the seller, and/or the forwarding company may be performed through the tracking web page provided by the automobile trade brokerage platform system 3. Also, tracking information of the vehicle or the documents provided through the tracking web page may be updated in real time.

FIG. 6 is a conceptual view illustrating a UI through which a buyer may check a PI and a B/L through an automobile trade brokerage platform system according to an embodiment.

Referring to FIG. 6, a buyer may check documents such as a PI and a B/L through UI elements 601, 602, and when necessary, may request the automobile trade brokerage platform system 3 to amend the documents by using UI elements 603, 604. When the buyer requests to amend a specific document, a progress state and date of an amendment request, and a manager's confirmation may be displayed to the buyer through a UI element 610.

Although not shown in FIG. 6, the buyer may receive the vehicle and then may transmit review information including a photograph and/or a video of the vehicle or a review directly input by the buyer to the automobile trade brokerage platform system 3. Also, the review information may include evaluation information about the seller of the vehicle purchased by the buyer, and evaluation information of each seller accumulated by buyers may be posted through the online shopping mall to be checked by other potential buyers. Also, the automobile trade brokerage platform system 3 may provide compensation such as points or discount benefits to the buyer that inputs the review information.

The automobile trade brokerage method according to the above embodiments has been described with reference to the flowchart illustrated in the drawing. Although the method has been illustrated and described using a series of blocks for brief description, the order of the blocks is not particularly limited, and some blocks may be performed simultaneously or in a different order from the order illustrated and described in this specification. Also, various orders of other branches, flow paths, and blocks may be implemented to achieve the same or similar results. Also, all the illustrated blocks may not be required to implement the method described in this specification.

An operation by the automobile trade brokerage method according to the above embodiments may be at least partially implemented as a computer program and may be recorded in a computer-readable recording medium. The computer-readable recording medium in which the program for implementing the operation by the automobile trade brokerage method according to the embodiments is recorded includes all kinds of recording devices in which computer-readable data is stored. Examples of the computer-readable recording medium include a read-only memory (ROM), a random-access memory (RAM), a compact disk (CD)-ROM, a magnetic tape, a floppy disk, and an optical data storage device. Also, the computer-readable recording medium may be distributed over network coupled computer systems so that computer-readable code is stored and executed in a distributed fashion. Also, functional programs, code, and code segments for implementing the present embodiment will be readily understood by one of ordinary skill in the art to which the present embodiment belongs.

While the present disclosure has been particularly shown and described with reference to embodiments thereof, they are provided for the purposes of illustration and it will be understood by one of ordinary skill in the art that various modifications and equivalent other embodiments may be made from the present disclosure. It should be understood that such modifications are included in the technical scope of the present disclosure. Accordingly, the true technical scope of the present disclosure should be determined by the technical spirit of the appended claims.

INDUSTRIAL APPLICABILITY

Embodiments relate to an automobile trade brokerage platform system, an automobile trade brokerage method, and a computer program therefor, and more particularly, to a global automobile trading platform for directly connecting a seller of an automobile to a buyer and performing direct export/direct import-related tasks such as payment, document delivery, and shipping.

The invention claimed is:

1. An automobile trade brokerage platform system comprising:
   an item register configured to register automobile products to be sold by one or more sellers as items for sale;
   a purchase processor configured to receive a purchase request for an item for sale among the items for sale from a buyer, generate a proforma invoice corresponding to the purchase request, and transmit the proforma invoice to the buyer;
   a shipping agency circuit configured to, when a purchase amount corresponding to the proforma invoice is paid by the buyer, generate a commercial invoice corresponding to the automobile product purchased by the buyer and request a server of a forwarding company for shipping, and provide information about a bill of landing to the buyer;
   a payment circuit configured to pay a sale amount to the seller after the automobile product requested by the buyer is received from the seller; and
   a review receiving unit configured to receive a review information from the buyer, the review information being related to the automobile product purchased by the buyer, and to provide a compensation for transmission of the review information to the buyer in a form of a virtual currency,
   wherein the shipping agency circuit is further configured to generate a first commercial invoice for the buyer, a second commercial invoice for the seller, and a third commercial invoice for the forwarding company corresponding to the automobile product purchased by the buyer, and respectively provide the first commercial invoice, the second commercial invoice, and the third commercial invoice to the buyer, the seller, and the forwarding company, wherein the first commercial invoice, the second commercial invoice, and the third commercial invoice comprise different information extracted according to trade terms from among at least one of product details, product price information, freight information, and insurance information corresponding to the automobile product purchased by the buyer, wherein the purchase processor is further configured to generate the proforma invoice by automatically calculating a transportation fee based on a location of the automobile product purchased by the buyer and a location of a near port of the buyer, wherein the purchase processor is configured to identify the near port of the buyer based on a network address of a buyer device, wherein the automobile trade brokerage platform system is configured to determine the trade terms matched to the automobile product based on a transaction history of a similar vehicle and to transmit the trade terms to the seller and the buyer, and wherein the similar vehicle is determined by comparing a score of the automobile product with a score of another automobile, where the score is a sum of scores given to each of factors including at least one of a price, state, type, manufacturer, grade, model, year, steering method, displacement, transmission, the number of seats, fuel type, number of doors, color, location, vehicle size, engine power, number of cylinders, drive type, or option specifications, wherein the shipping agency unit is further configured to provide a tracking information through a tracking web page, wherein the tracking information in the tracking web page is updated in real time to allow the buyer to check a purchase amount payment confirmation state or a shipping processing state in real time, wherein the automobile trade brokerage platform system is further configured to, through the tracking web page, receive a remittance receipt of the purchase amount uploaded by the buyer, and provide a confirmation receipt for the remittance, the first commercial invoice, a shipping information and the bill of landing to the buyer, wherein the payment unit is further configured to hold the purchase amount of the buyer without paying the purchase amount of the buyer to the seller until the automobile product purchased by the buyer is secured by the automobile trade brokerage platform system, and wherein the item registration unit is further configured to:
automatically generate a vehicle condition report corresponding to a vehicle by detecting at least one of corrosion, holes, or cracks formed in at least a portion of the vehicle from a vehicle image received from the seller,
transmit the automatically generated vehicle condition report to the seller,
in response to the seller approving the vehicle condition report, register the vehicle condition report in the automobile trade brokerage platform system, and provide the vehicle condition report to the buyer, and
wherein the at least one of corrosion, holes, or cracks is detected by detecting a discontinuous area on the vehicle image, the discontinuous area being a portion in the vehicle image composed of pixels with a deviation in predetermined characteristics above a predetermined threshold compared to other portions of the image.

2. The automobile trade brokerage platform system according to claim 1, wherein the first commercial invoice comprises product details, product price, and ocean freight corresponding to the automobile product requested to be purchased,
the second commercial invoice comprises the product details and the product price and does not comprise the ocean freight, and
the third commercial invoice comprises the product details and does not comprise the product price.

3. An automobile trade brokerage method comprising:
registering automobile products to be sold by one or more sellers as items for sale in an automobile trade brokerage platform system;
receiving, by the automobile trade brokerage platform system, a purchase request for an item for sale among the items for sale from a buyer;
generating, by the automobile trade brokerage platform system, a proforma invoice corresponding to the purchase request and transmitting the proforma invoice to the buyer;
when a purchase amount corresponding to the proforma invoice is paid by the buyer, generating, by the automobile trade brokerage platform system, a commercial invoice corresponding to the automobile product purchased by the buyer and requesting a server of a forwarding company for shipping;
providing, by the automobile trade brokerage platform system, information about a bill of landing to the buyer;
paying, by the automobile trade brokerage platform system, a sale amount to the seller after the automobile product requested by the buyer is received from the seller,
receiving a review information from the buyer, the review information being related to the automobile product purchased by the buyer, and
providing a compensation for transmission of the review information to the buyer in a form of a virtual currency,
wherein the requesting for the shipping comprises generating, by the automobile trade brokerage platform system, a first commercial invoice for the buyer, a second commercial invoice for the seller, and a third commercial invoice for the forwarding company corresponding to the automobile product purchased by the buyer and respectively providing the first commercial invoice, the second commercial invoice, and the third commercial invoice to the buyer, the seller, and the forwarding company, and
wherein the first commercial invoice, the second commercial invoice, and the third commercial invoice comprise different information extracted according to trade terms from among at least one of product details, product price information, freight information, and insurance information corresponding to the automobile product purchased by the buyer, and
wherein generating the proforma invoice comprises automatically calculating a transportation fee based on a location of the automobile product purchased by the buyer and a location of a near port of the buyer,
wherein the automobile trade brokerage method further comprises identifying the near port of the buyer based on a network address of a buyer device,
wherein the automobile trade brokerage method further comprises determining the trade terms matched to the automobile product based on a transaction history of a similar vehicle and to transmit the trade terms to the seller and the buyer, and wherein the similar vehicle is determined by comparing a score of the automobile product with a score of another automobile, where the score is a sum of scores given to each of factors including at least one of a price, state, type, manufacturer, grade, model, year, steering method, displacement, transmission, the number of seats, fuel type, number of doors, color, location, vehicle size, engine power, number of cylinders, drive type, or option specifications, and wherein the automobile trade brokerage method further comprises:
  providing, by the automobile trade brokerage platform system, a vehicle condition report corresponding to a vehicle;
  providing a tracking information through a tracking web page, wherein the tracking information in the tracking web page is updated in real time to allow the buyer to check a purchase amount payment confirmation state or a shipping processing state in real time,
  receiving, through the tracking web page, a remittance receipt of the purchase amount uploaded by the buyer, and
  providing, through the tracking web page, a confirmation receipt for the remittance, the first commercial invoice, a shipping information and the bill of landing to the buyer, and wherein paying the sale amount to the seller comprises, by the automobile trade brokerage platform system, holding the purchase amount of the buyer without paying the purchase amount of the buyer to the seller until the automobile product purchased by the buyer is secured, and wherein the providing of the vehicle condition report comprises:
  automatically generating, by the automobile trade brokerage platform system, the vehicle condition report by detecting at least one of corrosion, holes, or cracks formed in at least a portion of the vehicle from a vehicle image received from the seller,
  transmitting the automatically generated vehicle condition report to the seller,
  in response to the seller approving the vehicle condition report, registering the vehicle condition report in the automobile trade brokerage platform system, and
  providing the vehicle condition report to the buyer, and
  wherein the at least one of corrosion, holes, or cracks is detected by detecting a discontinuous area on the vehicle image, the discontinuous area being a portion in the vehicle image composed of pixels with a deviation in predetermined characteristics above a predetermined threshold compared to other portions of the image.

4. The automobile trade brokerage method according to claim 3, wherein the first commercial invoice comprises product details, product price, and ocean freight corresponding to the automobile product requested to be purchased,
  the second commercial invoice comprises the product details and the product price and does not comprise the ocean freight, and
  the third commercial invoice comprises the product details and does not comprise the product price.

5. A non-transitory computer-readable medium comprising instructions that, when executed by a processor, cause the processor to execute the method of claim 3 or claim 4 in combination with hardware.

* * * * *